H. HALL, Jr.

AX HELVE.

No. 11,312. Reissued Mar. 7, 1893.

Attest

Marion Donaldson

James M. Shaw

Inventor

Hiram Hall Jr.

by Ellis Spear

Atty

UNITED STATES PATENT OFFICE.

HIRAM HALL, JR., OF SOUTH THOMASTON, ASSIGNOR, BY DIRECT AND MESNE ASSIGNMENTS, TO THE HALL MANUFACTURING COMPANY, OF ROCKLAND, MAINE.

AX-HELVE.

SPECIFICATION forming part of Reissued Letters Patent No. 11,312, dated March 7, 1893.

Original No. 441,408, dated November 25, 1890. Application for reissue filed November 22, 1892. Serial No. 452,860.

*To all whom it may concern:*

Be it known that I, HIRAM HALL, Jr., of South Thomaston, in the county of Knox, State of Maine, have invented certain new and useful Improvements in Ax-Helves, of which the following is a description sufficiently full, clear, and exact to enable any person skilled in the art or science to which said invention appertains to make and use the same, reference being had to the accompanying drawings, forming part of this specification, in which—

Figure 1:
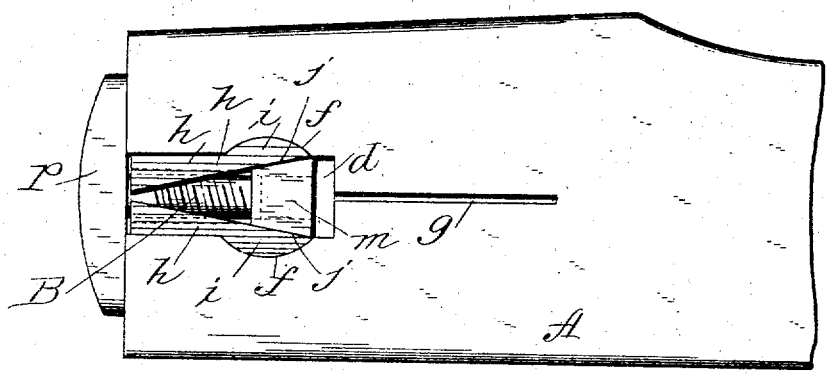
Figure 2:
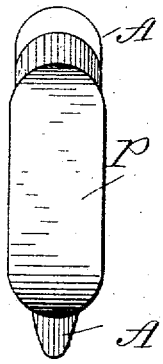
Figure 3:
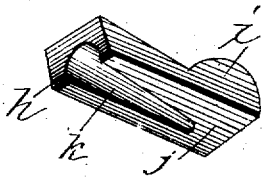

Figure 1, is an elevation of an ax-helve provided with my improved expanding device; Fig. 2, an end elevation of the same, and Fig. 3, a perspective view of one of the wedges detached.

Like letters of reference indicate corresponding parts in the different figures of the drawings.

My invention relates to means for fastening the helve in the socket of an ax, and is designed especially as an improvement on the device shown and described in Letters Patent of the United States No. 406,899, dated July 16, 1889, granted to me for an improvement in ax-helves.

The nature and operation of the improvement will be readily understood by all conversant with such matters from the following explanation.

In the drawings, A represents the ax-helve, which is provided in its outer end with a chamber *d*, in the side walls of which a curved groove or indentation *f*, is formed, said chamber opening at the head of the ax. From the bottom of the chamber a saw-kerf *g*, extends longitudinally into the body of the helve. Two wedges *h*, (shown in perspective in Fig. 3) are adapted to be inserted in the chamber *d*, and are severally provided with a curved boss or projection *i*, fitted to enter the grooves *f*, in the walls of said chamber. The inner face *j*, of said wedges is provided with a vertical groove *k*. A screw B, is fitted to enter the opening formed by the grooves in said wedges when in position in the chamber, and a nut *m*, is turned onto the lower end of said screw, said nut having inclined walls adapted to engage the inclined faces *j*, of said wedges. The screw is provided with an elongated approximately oval shaped head *p*, of sufficient width to slightly overlap the head of the helve at the side and engage the ax when in position on said helve.

In the use of my improvement the nut *m*, is disposed in the chamber *d*, and the wedges *h*, adjusted therein, with their bosses *i*, inserted in the grooves *f*, of said chamber. The helve is then inserted in the ax-eye and the screw B, passed into the opening formed by the grooves *k*, in said wedges and turned into said nut *m*. The nut as the screw is rotated works outward thereon and engaging the faces *j*, of the wedges forces said wedges tightly against the walls of the chamber *d*, and expands the helve at this point, so that it is clamped securely into the ax-eye. The pressure thus exerted being lateral necessitates the employment of a short nut. In the device described in the Letters Patent above referred to such pressure has a tendency to compress the wood or embed the nut therein, especially after remaining some time in one position. By employing the metallic wedges *h*, in the chamber *d*, the pressure is exerted equally on the whole length of the chamber-wall. Moreover, the nut, moving on metallic surfaces; slides much more readily and cannot embed itself in the wood. The bosses *i*, on said wedges prevent them from becoming displaced from the chamber by the pressure of the nut, and said nut distributes the pressure, so that it is applied to the extreme end of the handle or at the mouth of said chamber, where it is the most effective in securing the ax-head thereon.

I do not confine myself to the use of this device in ax-helves as it is equally applicable to use in hammer-handles and similar tools. By constructing the head *p*, so that it will over-lap the edges of the helve and engage the ax-head an additional fastening is provided to prevent said head from accidentally becoming detached from the helve.

Having thus explained my invention, what I claim is—

1. In an ax-helve, the combination, of a chamber formed in the outer end thereof, having curved grooves in its side walls, a saw-kerf extending inwardly from the bottom of said chamber, wedges having bosses adapted to enter said grooves and inclined inner faces provided with vertical grooves for receiving a screw, a beveled nut disposed in said chamber, and a screw provided with an approximately oval or button shaped head and working said nut, substantially as described.

2. In an ax-helve, the helve A, provided with the chamber *d*, having the grooves *f*, in its walls, the saw-kerf *g*, the wedges *h*, provided with the grooves *k*, and bosses *i*, the nut *m*, and the screw B, working in said nut and provided with the curved head *p*, combined and arranged to operate, substantially as set forth.

3. In an ax-helve provided with a chamber in its head having a saw-kerf extending longitudinally from the bottom thereof, the combination of two edges adapted to be inserted in said chamber and provided with the inclined working-faces and vertical grooves, with a screw having an oval-shaped head and a nut on said screw provided with inclined faces adapted to engage said wedges, substantially as described.

4. A helve having a chambered head, combined with wedges fitted to the walls of said chamber, and with a nut and screw, the said nut being arranged to bear upon the said wedges, and the screw being arranged to force the said nut upon the wedge faces, substantially as described.

5. A helve having a chambered head with grooves in the walls of said chamber combined with wedges having bosses fitted to said grooves, a nut arranged to bear upon said wedges, and to press them outward and a screw arranged to force said nut upon the wedge faces substantially as described.

6. A helve having a chambered head combined with wedges, having grooves and bosses fitted to the walls of said chamber, said chamber having grooves for the bosses, and with a nut and screw for spreading said wedge, all substantially as described.

HIRAM HALL, JR.

Witnesses:
C. E. LITTLEFIELD,
A. S. LITTLEFIELD.